US012571519B2

(12) United States Patent
Kunimune et al.

(10) Patent No.: US 12,571,519 B2
(45) Date of Patent: Mar. 10, 2026

(54) WAVELENGTH CONVERSION MODULE, LIGHT EMISSION DEVICE, AND METHOD FOR MANUFACTURING WAVELENGTH CONVERSION MODULE

(71) Applicant: NICHIA CORPORATION, Anan (JP)

(72) Inventors: Teppei Kunimune, Tokushima (JP); Yukihiro Hayashi, Tokushima (JP); Masatsugu Ichikawa, Tokushima (JP)

(73) Assignee: NICHIA CORPORATION, Anan (JP)

(*) Notice: Subject to any disclaimer, the term of this patent is extended or adjusted under 35 U.S.C. 154(b) by 0 days.

(21) Appl. No.: 18/836,287

(22) PCT Filed: Jan. 27, 2023

(86) PCT No.: PCT/JP2023/002633
§ 371 (c)(1),
(2) Date: Aug. 6, 2024

(87) PCT Pub. No.: WO2023/153241
PCT Pub. Date: Aug. 17, 2023

(65) Prior Publication Data

US 2025/0198598 A1 Jun. 19, 2025

(30) Foreign Application Priority Data

Feb. 9, 2022 (JP) ................................ 2022-018365
Oct. 26, 2022 (JP) ................................ 2022-171586

(51) Int. Cl.
*F21V 9/30* (2018.01)

(52) U.S. Cl.
CPC ..................................... *F21V 9/30* (2018.02)

(58) Field of Classification Search
CPC . F21V 29/502; F21V 9/32; F21V 9/30; F21V 29/70; F21V 29/85; F21V 29/10; F21V 7/26; F21V 7/24
See application file for complete search history.

(56) References Cited

U.S. PATENT DOCUMENTS

2009/0184624 A1 7/2009 Schmidt et al.
2013/0015759 A1 1/2013 Chiang et al.
2016/0040857 A1 2/2016 Inoue et al.
2018/0119923 A1 5/2018 Takada et al.
(Continued)

FOREIGN PATENT DOCUMENTS

CN 109282246 A 1/2019
CN 113214820 A 8/2021
(Continued)

OTHER PUBLICATIONS

International Search Report and Written Opinion of the International Searching Authority issued in the corresponding International Patent Application No. PCT/JP2023/002633, dated Apr. 4, 2023 with English language translations.

*Primary Examiner* — William J Carter
(74) *Attorney, Agent, or Firm* — Foley & Lardner LLP

(57) ABSTRACT

A wavelength conversion module includes: a phosphor member; and a light-transmissive substrate that is directly bonded to the phosphor member, wherein a higher thermal conductivity of the light-transmissive substrate is higher than a thermal conductivity of the phosphor member, and the light-transmissive substrate has a thickness in a range from 100 μm to 600 μm.

22 Claims, 6 Drawing Sheets

(56) References Cited

U.S. PATENT DOCUMENTS

| | | | | |
|---|---|---|---|---|
| 2018/0180975 | A1 | 6/2018 | Furuyama et al. | |
| 2018/0356715 | A1 | 12/2018 | Kobayashi et al. | |
| 2019/0058303 | A1 | 2/2019 | Miura | |
| 2019/0093871 | A1 | 3/2019 | Sato et al. | |
| 2019/0120442 | A1 | 4/2019 | Okada et al. | |
| 2019/0285974 | A1 | 9/2019 | Kobayashi et al. | |
| 2019/0294032 | A1 | 9/2019 | Hirano et al. | |
| 2019/0309936 | A1* | 10/2019 | Kondo ............... | C09K 11/7774 |
| 2019/0338937 | A1 | 11/2019 | Inoue et al. | |
| 2020/0058830 | A1 | 2/2020 | Furuyama | |
| 2020/0303597 | A1 | 9/2020 | Takaku et al. | |
| 2021/0323061 | A1* | 10/2021 | Kunimune ......... | G03B 21/2033 |
| 2022/0052506 | A1 | 2/2022 | Miura | |
| 2022/0216668 | A1 | 7/2022 | Miura | |
| 2023/0041361 | A1 | 2/2023 | Kunimune et al. | |
| 2023/0364676 | A1 | 11/2023 | Kunimune et al. | |

FOREIGN PATENT DOCUMENTS

| | | | |
|---|---|---|---|
| CN | 113701125 | A | 11/2021 |
| JP | 2008-515184 | A | 5/2008 |
| JP | 2013-018981 | A | 1/2013 |
| JP | 2014-157698 | A | 8/2014 |
| JP | 2016-157905 | A | 9/2016 |
| JP | 2016-225581 | A | 12/2016 |
| JP | 2017-058654 | A | 3/2017 |
| JP | 2017-181685 | A | 10/2017 |
| JP | 2018-107065 | A | 7/2018 |
| JP | 2018-109664 | A | 7/2018 |
| JP | 2018-163816 | A | 10/2018 |
| JP | 2018-173605 | A | 11/2018 |
| JP | 2019-036638 | A | 3/2019 |
| JP | 2019-066632 | A | 4/2019 |
| JP | 2019-105846 | A | 6/2019 |
| JP | 2020-127056 | A | 8/2020 |
| JP | 6737265 | B2 | 8/2020 |
| JP | 2021-152615 | A | 9/2021 |
| JP | 2021-170587 | A | 10/2021 |
| JP | 2022-038104 | A | 3/2022 |
| JP | 2022-066298 | A | 4/2022 |
| JP | 2023-016550 | A | 2/2023 |
| WO | WO-2016/181768 | A1 | 11/2016 |
| WO | WO-2016/185850 | A1 | 11/2016 |
| WO | WO-2017/183606 | A1 | 10/2017 |
| WO | WO-2018/042825 | A1 | 3/2018 |
| WO | WO-2018/110316 | A1 | 6/2018 |
| WO | WO-2018/230333 | A1 | 12/2018 |

* cited by examiner

WAVELENGTH CONVERSION MODULE, LIGHT EMISSION DEVICE, AND METHOD FOR MANUFACTURING WAVELENGTH CONVERSION MODULE

CROSS-REFERENCE TO RELATED APPLICATIONS

This is a national stage application of PCT Application No. PCT/JP2023/002633, filed on Jan. 27, 2023, which claims priority to Japanese Patent Application No. 2022-018365, filed on Feb. 9, 2022, and Japanese Patent Application No. 2022-171586, filed on Oct. 26, 2022.

BACKGROUND

The present disclosure relates to a wavelength conversion module, a light-emitting device, and a method for manufacturing the wavelength conversion module.

In recent years, as light sources of a headlamp, various illumination devices, and a laser projector, for example, high output light sources such that blue light from a semiconductor laser is wavelength-converted by a phosphor member have been widely used. In such a light source, because the phosphor member generates heat with the wavelength conversion, the heat generated in the phosphor member needs to be efficiently dissipated. In particular, in a wavelength conversion module used in the light source using a semiconductor laser, a wavelength conversion member having good resistivity needs to be used and heat generated in the wavelength conversion member needs to be efficiently dissipated.

As an example, JP 6737265 B ("Patent Document 1") discloses an optical conversion device including a phosphor member that is excited by excitation light, a first condensing lens that has a lens bottom surface to which the phosphor member is bonded and allows the excitation light to enter the phosphor member, and a heat dissipation member provided on the lens bottom surface around a region to which the phosphor member is bonded. According to Patent Document 1, heat generated in the phosphor member can be cooled in a motor-less manner, thereby reducing the size and improving the reliability.

SUMMARY

However, a higher output light source is needed, and a wavelength conversion module including a wavelength conversion member used for such a light source is also needed to have higher reliability.

Therefore, an object of the present disclosure is to provide a wavelength conversion module with high reliability, a light-emitting device including the wavelength conversion module, and a method for manufacturing the wavelength conversion module.

A wavelength conversion module according to the present disclosure includes a phosphor member, and a light-transmissive substrate that is directly bonded to the phosphor member, has a thermal conductivity higher than a thermal conductivity of the phosphor member, and has a thickness in a range from 100 μm to 600 μm.

A light-emitting device according to the present disclosure includes the above wavelength conversion module and a light source configured to irradiate the wavelength conversion module with light.

A method for manufacturing a wavelength conversion module according to the present disclosure includes directly bonding a light-transmissive substrate and a phosphor member to each other, and singulating the light-transmissive substrate and the phosphor member that are directly bonded to each other.

Advantageous Effects of Invention

The wavelength conversion module and the light-emitting device configured as described above can have higher reliability. The method for manufacturing the wavelength conversion module configured as described above enables manufacture of a wavelength conversion module with higher reliability.

DETAILED DESCRIPTION

Figure 1:
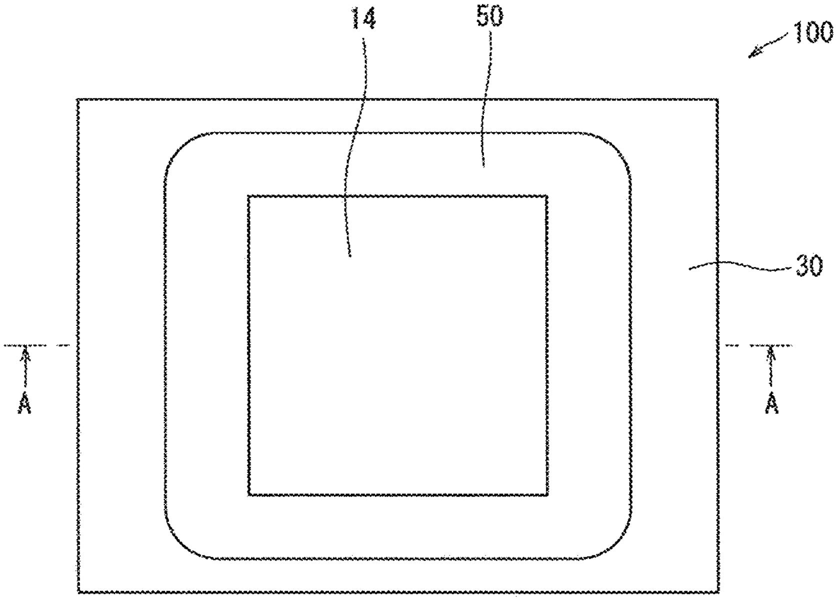
FIG. 1 is a top view of a wavelength conversion module according to the present disclosure.

Embodiments and examples for carrying out the present disclosure are described below with reference to the drawings. Note that a wavelength conversion module and a light-emitting device to be described below are merely intended to embody the technical concept of the present disclosure, and the present disclosure is not limited to the following unless otherwise specified.

In each drawing, members having identical functions may be denoted by the same reference signs. In view of the ease of explanation or understanding of the main points, the embodiments and examples may be illustrated separately for convenience, but the partial substitutions or combinations of the configurations illustrated in different embodiments and examples are possible. In the embodiments and examples to be described below, descriptions of matters common to those already described are omitted, and only different points are described. In particular, similar actions and effects of similar configurations shall not be mentioned sequentially for each embodiment and example. The size, positional relationship, and the like of members illustrated in the drawings may be exaggerated in order to clarify explanation. As a cross-sectional view, an end view illustrating only a cut surface may be used.

Embodiments according to the present disclosure are described below in detail.

The optical conversion device disclosed in Patent Document 1 is configured such that the phosphor member is bonded to the lens bottom surface of the first condensing lens, and at least a periphery of the region to which the phosphor member is bonded on the lens bottom surface is bonded to the heat dissipation member. The first condensing lens is described as serving as a lens, and Patent Document 1 discloses no specific description about the thickness of the first condensing lens.

In the optical conversion device disclosed in Patent Document 1, when the surface of the phosphor member is irradiated with a laser, the phosphor member is excited by the laser light, the light is converted into light with a wavelength different from the wavelength of the excitation light, and the light obtained by wavelength conversion is extracted. When the wavelength conversion is performed, the excited phosphor member generates heat and the temperature of the phosphor member rises. When the temperature of the phosphor member rises, the wavelength conversion efficiency decreases. Therefore, in Patent Document 1, the heat dissipation member is provided to dissipate heat generated by the phosphor member via the heat dissipation member, thereby suppressing the temperature rise of the phosphor member. Specifically, the phosphor member is disposed at the center portion of the lens bottom surface on the opposite side of a lens convex surface, and the heat dissipation member is bonded to a lower surface of the phosphor member and the lens bottom surface around the phosphor member to suppress the temperature rise of the phosphor member.

However, regarding the optical conversion device of Patent Document 1, although a certain heat dissipation effect is obtained, the heat dissipating property is insufficient. This is because although a part of the heat generated in the phosphor member is transmitted to the condensing lens, the heat transferred to the condensing lens is not easily transferred to other members and is not easily dissipated, and thus the heat is likely to be retained. It is difficult to reduce the size of the heat dissipation member that dissipates heat from the optical conversion device. The present inventors have made intensive studies with the following findings to provide a wavelength conversion module in which a temperature rise of a phosphor member can be effectively suppressed with capability of size reduction.

When the phosphor member is irradiated with excitation light, the vicinity of the surface of the phosphor member is mainly excited, and the excitation light is attenuated as the excitation light enters the inside of the phosphor member. As a result, an efficient wavelength conversion action is unlikely to be obtained in the phosphor member. In other words, heat is generated mainly in the vicinity of the surface of the phosphor member irradiated with the excitation light, and the amount of heat generated decreases as the excitation light enters the inside of the phosphor member. Thus, in order to effectively suppress the temperature rise of the phosphor member, adopting a configuration that can effectively dissipate the heat generated in the vicinity of the surface of the phosphor member is preferable.

Therefore, on the basis of the above findings, in the present disclosure, a light-transmissive substrate with a thermal conductivity higher than a thermal conductivity of the phosphor member is directly bonded to the light irradiation surface of the phosphor member so that heat generated in the vicinity of the light irradiation surface of the phosphor member can be effectively dissipated, and on the other hand, a region not contributing to the heat dissipate is reduced, thereby reducing the size of the wavelength conversion module. In the present disclosure, the thickness of the light-transmissive substrate is set in a certain range to improve the heat dissipation efficiency.

In consideration of the fact that heat is generated mainly in the vicinity of the surface of the phosphor member irradiated with the excitation light and the amount of heat generated decreases as the excitation light enters the inside from the surface, the thickness of the phosphor member is preferably set in a range in which the wavelength conversion efficiency and the heat dissipation effect of the phosphor member can be compatible with each other in the present disclosure. That is, when the thickness of the phosphor member is large, the temperature of the phosphor member rises due to the heat of the high output excitation light, and the wavelength conversion efficiency of the phosphor member is not able to be improved, and even though the heat dissipation member is bonded to the lower surface of the phosphor member, the heat is not able to be efficiently transferred to the heat dissipation member.

When the excitation light is intensively emitted to a part of the light irradiation surface of the phosphor member, because the temperature of this part rises drastically, the conversion efficiency of this part may decrease, and efficiently dissipating the generated heat may become difficult. Accordingly, the entire light irradiation surface of the phosphor member is preferably irradiated with excitation light with a desired substantially uniform intensity. However, in the light-transmissive member having a lens shape as disclosed in Patent Document 1, because the excitation light is condensed by refraction by the lens, the temperature of a part of the phosphor member may rise drastically.

Therefore, on the basis of the above findings, in the present disclosure, a light-transmissive member is made into a light-transmissive substrate and an upper surface of the light-transmissive substrate is made flat, so that the heat transfer efficiency in a lateral direction of the light-transmissive member can be increased and the heat dissipation property can be enhanced, and it makes it easier to irradiate the upper surface of the light-transmissive substrate with excitation light substantially uniformly and to irradiate an entire light irradiation surface of a phosphor member with excitation light with a substantially uniform intensity.

That is, when the upper surface of the light-transmissive substrate is flat, an optical system is easily configured such that the flat surface can be substantially uniformly irradiated with light from a light source. Considering that the entire light irradiation surface of the phosphor member is irradiated with the excitation light with a substantially uniform intensity, the thickness of the light-transmissive substrate serving as the path of the excitation light is preferably set within a certain range. Although the light-transmissive substrate is light-transmissive, light is attenuated. Accordingly, by reducing the thickness of the light-transmissive substrate, the attenuation of light with which the light irradiation surface of the phosphor member is irradiated can be suppressed, and a decrease in the wavelength conversion efficiency can be suppressed.

The present disclosure has been made as a result of intensive studies based on the above findings, and can efficiently dissipate heat generated in a phosphor member and reduce the size of a wavelength conversion module.

Figure 2A:
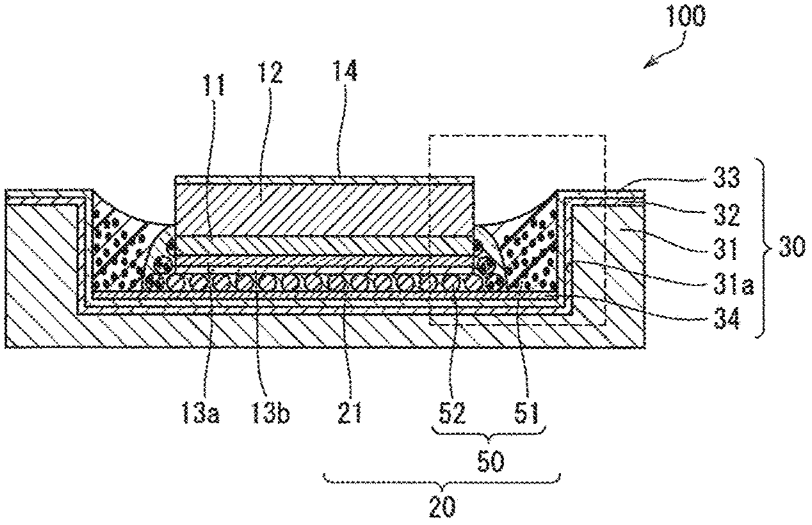
FIG. 2A is a cross-sectional view taken along line A-A of the wavelength conversion module illustrated in FIG. 1.
Figure 2B:
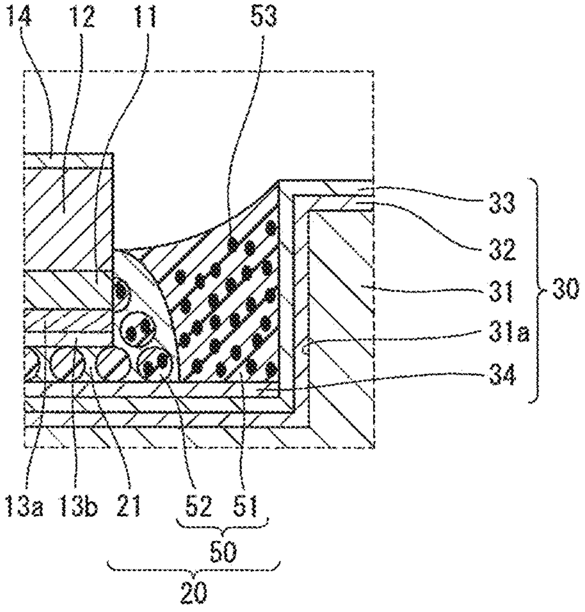
FIG. 2B is an enlarged cross-sectional view of a part of the cross-sectional view of FIG. 2A.
Figure 3:
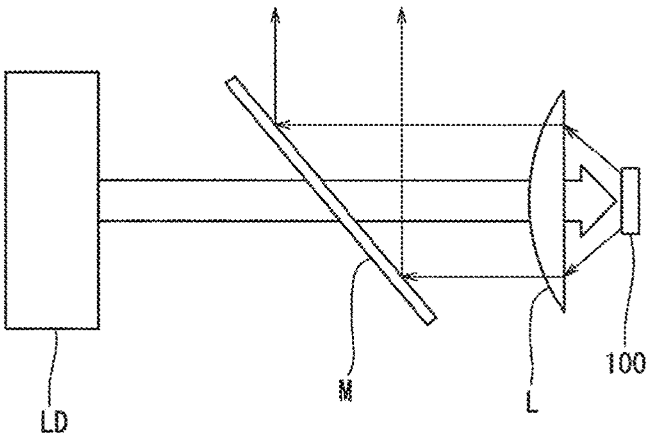
FIG. 3 is a schematic view illustrating a light-emitting device according to the present disclosure.

Specifically, a wavelength conversion module 100 includes a phosphor member 11 and a light-transmissive substrate 12 that is directly bonded to the phosphor member 11, has a thermal conductivity higher than a thermal conductivity of the phosphor member 11, and has a thickness in a range from 100 μm to 600 μm (see FIGS. 2A and 2B). In this way, because the phosphor member 11 is directly bonded to the light-transmissive substrate 12 having a thermal conductivity higher than a thermal conductivity of the phosphor member 11 and having a thickness in a range from 100 μm to 600 μm, heat generated in the phosphor member 11 can be efficiently dissipated via the light-transmissive substrate 12. The wavelength conversion module 100 of the present disclosure can be used as, for example, a reflective-type wavelength conversion module. In the reflective-type wavelength conversion module, an incident surface on which excitation light is incident and an emission surface from which wavelength-converted light is emitted are the same surface. The wavelength conversion module 100 may be a transmissive wavelength conversion module. In the transmissive wavelength conversion module, an incident surface on which excitation light is incident and an emission surface from which wavelength-converted light is emitted are opposed to each other. More specific aspects are described below in detail with reference to FIGS. 1 to 2B.

—Phosphor Member—

The phosphor member 11 illustrated in FIGS. 2A and 2B may be excited by light from a light source and emit light with a wavelength different from the wavelength of the light from the light source. The phosphor member 11 is preferably formed of a phosphor. In the present specification, the phosphor member formed of a phosphor implies that inevitable mixing of a component other than the phosphor is not excluded, and the content of the component other than the phosphor is, for example, 5 volume % or less. As an example of the phosphor member 11, a polycrystalline body is suitable, and a sintered compact composed of a rare earth aluminate phosphor having a composition expressed by Formula (I) below is preferable. The rare earth aluminate phosphor is chemically and thermally very stable phosphor.

$$(Ln_{1-n}Ce_n)_3(Al_{1-m}M1_m)_5O_{12} \quad (I)$$

(In Formula (I) above, Ln is at least one rare earth element selected from the group consisting of Y, La, Lu, Gd, and Tb, M1 is at least one element selected from Ga and Sc, and m and n are numbers satisfying $0 \leq m \leq 0.02$ and $0.0017 \leq n \leq 0.0170$, respectively).

The phosphor member 11 can be composed of a YAG plate formed of a sintered compact of yttrium aluminum garnet or an LAG plate formed of a sintered compact of lutetium aluminum garnet as an example of the sintered compact composed of the rare earth aluminate phosphor, and is selected according to the configuration of a projector to be used. The thickness of the phosphor member 11 is to be described below in detail, and may be preferably 200 μm or less, more preferably less than 95 μm, even more preferably less than 80 μm, even more preferably less than 70 μm. By setting the thickness of the phosphor member 11 within this range, when a heat dissipation member is disposed on a lower surface of the phosphor member 11, heat generated in the vicinity of a surface of the phosphor member 11 can be efficiently transferred to the heat dissipation member. The thickness of the phosphor member 11 is preferably 50 μm or more, for example. By setting the thickness of the phosphor member 11 within this range, high wavelength conversion efficiency can be obtained. The Ce content (mol %) of the phosphor in the phosphor member 11 is calculated by $n \times 3 \times 100/(3+5+12)$ using the Ce substitution ratio n described above, and is preferably in a range from 0.025 mol % to 0.255 mol %. Such a Ce content can suppress a decrease in luminous efficiency at high temperatures, and thus is particularly suitable for use in a high output laser.

The relative density of the rare earth aluminate sintered compact is in a range from 85% to 99%, preferably 89% or more, more preferably 90% or more, even more preferably 91% or more, and may be particularly preferably 92% or more. When the relative density of the rare earth aluminate sintered compact is in a range from 85% to 99%, excitation light incident on the sintered compact is efficiently scattered by voids, and the scattered light is efficiently wavelength-converted by a crystalline phase, so that the wavelength-converted light can be emitted from the same surface as a surface on which the excitation light is incident.

The relative density of the rare earth aluminate sintered compact can be calculated from the apparent density of the sintered compact and the true density of the sintered compact by Equation (1) below.

[Math. 1]

$$\text{Relative Density (\%) of Rare Earth Aluminate Sintered Compact} = \text{(Apparent Density of Rare Earth Aluminate Sintered Compact)/(True Density of Rare Earth Aluminate Sintered Compact)} \times 100 \quad (1)$$

The apparent density of the rare earth aluminate sintered compact is a value obtained by dividing the mass of the sintered compact by the volume of the sintered compact, and can be calculated by Equation (2) below. As the true density of the rare earth aluminate sintered compact, the true density of the rare earth aluminate phosphor can be used.

[Math. 2]

Apparent Density of Rare Earth Aluminate Sintered Compact=(Mass (g) of Rare Earth Aluminate Sintered Compact)/(Volume (Archimedes method) ($cm^3$) of Rare Earth Aluminate Sintered Compact) (2)

The rare earth aluminate sintered compact preferably has a void ratio in a range from 1% to less than 15%. The void ratio of the rare earth aluminate sintered compact is a value obtained by subtracting the relative density of the sintered compact from 100%, and can be calculated by Equation (3) below when necessary.

[Math. 3]

$$\text{Porosity (\%) of Rare Earth Aluminate Sintered Compact} = 100\% - \text{Relative Density (\%) of Rare Earth Aluminate Sintered Compact} \quad (3)$$

In the rare earth aluminate sintered compact, the voids are preferably dispersed around the crystalline phase. When the voids are dispersed around the crystalline phase, the excitation light incident on the sintered compact is scattered by the voids dispersed around the crystalline phase, and the dispersed light is efficiently wavelength-converted by the crystalline phase. Thus, the wavelength-converted light can be efficiently emitted from the same surface as the surface on which the excitation light is incident.

The phosphor member 11 may contain other known phosphors in addition to or in place of the rare earth aluminate phosphor. The other known phosphors are, for example, BSESN-based phosphors (for example, (Ba,Sr)$_2Si_5N_8$:Eu).

The phosphor member 11 has a rectangular planar shape, for example. The size of the phosphor member 11 is, for example, a 1 mm to 6 mm square in a plan view. When the size is equal to or greater than a 1 mm square, the wavelength conversion efficiency of the phosphor member 11 can be improved, and misalignment of the excitation light is unlikely to occur. When the plane area of the phosphor member is twice or more the spot size of the excitation light, misalignment of the excitation light is particularly unlikely to occur. From the viewpoint of simplicity of a manufacturing method, the planar shape of the phosphor member 11 is preferably a rectangular shape. The planar shape of the phosphor member 11 is not limited to a rectangular shape, and may be a circular shape, an elliptical shape, or another polygonal shape.

—Light-transmissive Substrate—

The light-transmissive substrate 12 has a thermal conductivity higher than a thermal conductivity of the phosphor member 11 and allows a part of heat generated in the phosphor member 11 to be released to the light-transmissive substrate 12. The thermal conductivity of the light-transmissive substrate 12 is, for example, 1.2 times to 200 times, preferably 1.2 times to 5 times, more preferably 1.2 times to 4 times the thermal conductivity of the phosphor member 11. The thermal conductivity of the YAG plate used as an example of the phosphor member 11 is about 11.7 W/m·K, and the thermal conductivity of the light-transmissive substrate 12 is preferably higher than 11.7 W/m·K, and is preferably 15 W/m·K or more. In general, a value at room temperature (20+20° C.) is used for the thermal conductivity unless otherwise specified.

The light-transmissive substrate 12 is light-transmissive in order to allow the phosphor member 11 to appropriately receive light from the light source. The term "light-transmissive" described in the present specification means that 80% or more of light from the light source is transmitted. As the light-transmissive substrate 12 having such thermal conductivity and light transmissivity, a sapphire substrate or a diamond substrate is preferable.

The light-transmissive substrate 12 has a flat plate shape and has a thickness in a range from 100 μm to 600 μm. The thickness of the light-transmissive substrate 12 is preferably 0.6 times to 12 times, more preferably 2 times to 8 times the thickness of the phosphor member 11. When the thickness of the light-transmissive substrate 12 is 100 μm or more, the light-transmissive substrate 12 serves as a heat dissipation member that efficiently dissipates heat. When the thickness of the light-transmissive substrate 12 is 600 μm or less, the amount of light emitted from a lateral surface of the light-transmissive substrate 12 can be reduced, and light can be efficiently extracted from above the light-transmissive substrate 12. An upper surface of the light-transmissive substrate 12 is preferably a flat surface that is not curved like a convex lens. When the upper surface of the light-transmissive substrate 12 is a flat surface, a part of light extracted from the wavelength conversion module 100 is totally reflected between the light-transmissive substrate 12 and the air. Light having a total reflection angle or more is returned to the inside of the light-transmissive substrate 12, and a part of the light is extracted from the light-transmissive substrate 12 after being scattered and reflected. On the other hand, light having an angle smaller than the total reflection angle is extracted from the light-transmissive substrate 12 as is. Thus, because strong light emission is obtained in a narrow range smaller than the total reflection angle, light transmitted through the light-transmissive substrate 12 can be efficiently taken into a secondary lens of the optical system. When the upper surface of the light-transmissive substrate 12 has a shape like a convex lens, most of the light extracted from the wavelength conversion module 100 can be extracted from the light-transmissive substrate 12, but the light transmitted through the light-transmissive substrate 12 is emitted while spreading over a wide angle. Therefore, a large amount of light emitted from the light-transmissive substrate 12 is not able to be taken into the secondary lens, resulting in an increase in the proportion of unused light. In the light-transmissive substrate 12, the ratio of the thinnest portion to the thickest portion of the light-transmissive substrate 12 is preferably 0.8 or more, more preferably 0.9 or more, particularly preferably 0.98 or more. The light-transmissive substrate 12 may be a light-transmissive substrate having the same thickness. By forming the light-transmissive substrate 12 in a flat plate shape and setting the thickness thereof in the above range, the upper surface of the light-transmissive substrate is easily irradiated with excitation light substantially uniformly and the entire light irradiation surface of the phosphor member is easily irradiated with excitation light with a substantially uniform intensity as described above. By setting the thickness as described above, heat generated in the phosphor member 11 can be appropriately released to the light-transmissive substrate 12 from the irradiation surface side of the phosphor member 11 irradiated with a laser.

The light-transmissive substrate 12 is directly bonded to the phosphor member 11. The term "direct bonding" described in the present specification means an aspect in which the light-transmissive substrate 12 and the phosphor member 11 are in direct contact with each other and bonded to each other without an adhesive or the like interposed therebetween. That is, in the case of using a high output laser, when the light-transmissive substrate and the phosphor member are bonded to each other using an adhesive, the adhesive may be burned out; thus, no adhesive is preferably used. An antireflection film and other layers to be described below are not preferably located between the light-transmissive substrate 12 and the phosphor member 11. When an antireflection film or the like is disposed on an upper surface of the phosphor member 11, heat generated on the surface of the phosphor member 11 may be confined by the antireflection film or the like, and there is a possibility that the heat may not be efficiently dissipated. On the other hand, in the wavelength conversion module of the present disclosure, because the phosphor member 11 is in direct contact with the light-transmissive substrate 12 with a high thermal conductivity, heat generated in the phosphor member 11 can be appropriately released to the light-transmissive substrate 12. Although the direct bonding is described below, a bonding method such as surface activated bonding or atomic diffusion bonding can be used, for example. By thus directly bonding the light-transmissive substrate 12 to the phosphor member 11, heat generated in the vicinity of the irradiation surface of the phosphor member can be efficiently transferred to the light-transmissive substrate 12. Because the light-transmissive substrate 12 has a thermal conductivity higher than a thermal conductivity of the phosphor member 11, a region where heat diffuses in a horizontal direction is larger in the light-transmissive substrate 12 than in the phosphor member 11. That is, most of the heat generated in the vicinity of the irradiation surface of the phosphor member 11 is diffused to the side of the light-transmissive substrate 12 with a high thermal conductivity, and then, the heat can be efficiently diffused in the horizontal direction inside the light-transmissive substrate 12.

The light-transmissive substrate 12 may be singulated together with the phosphor member 11 by using a dicing blade or a laser beam, as described below in a method for manufacturing the wavelength conversion module. Therefore, the planar shape or the plane area of the light-transmissive substrate 12 may be substantially equal to the planar shape or the plane area of the phosphor member 11. Similar to the phosphor member 11, the light-transmissive substrate 12 may also have a rectangular shape in a plan view. The phosphor member 11 and the light-transmissive substrate 12 having substantially the same shape in this way contribute to a reduction in the size of the wavelength conversion module, and the entire light irradiation surface of the phosphor member 11 can be irradiated with excitation light with a desired substantially uniform intensity.

As described above, in the wavelength conversion module of the present disclosure, the phosphor member 11 is directly bonded to the light-transmissive substrate 12 having a thermal conductivity higher than a thermal conductivity of the phosphor member 11 and having a thickness in a range from 100 μm to 600 μm. Thus, heat generated in the phosphor member 11 can be appropriately released to the light-transmissive substrate 12 from the irradiation surface side of the phosphor member 11 irradiated with a laser.

<Other Additional Configurations>

As illustrated in FIGS. 2A and 2B, the wavelength conversion module may include, in addition to the phosphor member 11 and the light-transmissive substrate 12 described above, a base 30, a bonding member 20 that bonds the base 30 and the phosphor member 11 to each other, a reflective film 13*a*, a bonding metal 13*b*, and an antireflection film 14 provided on the light-transmissive substrate 12.

—Base—

The base 30 may include a base member 31 having a recessed portion 31*a*, a first metal layer 32 provided on an upper surface of the base member 31 including an inner surface of the recessed portion 31*a*, and a second metal layer 33 provided on the first metal layer 32. The base member 31 is preferably copper or a copper alloy in terms of heat dissipation and processability. The first metal layer 32 is, for example, nickel (Ni), and the thickness is preferably in a range from 0.1 μm to 3.0 μm. The second metal layer 33 is, for example, gold (Au), and the thickness is preferably in a range from 0.02 μm to 5.0 μm. A third metal layer 34 for adjusting a spacing between the base 30 and the phosphor member 11 may be further provided on the second metal layer 33 at a bottom portion of the recessed portion 31*a*. As an example of the third metal layer 34, silver (Ag) may be used, and the thickness can be appropriately set according to the spacing between the base 30 and the phosphor member 11. For example, the thickness of the third metal layer 34 is preferably in a range from 0.1 μm to 100 μm, but the third metal layer 34 need not be provided.

—Bonding Member—

The bonding member 20 bonds the base 30 and a member including at least the phosphor member 11. The bonding member 20 includes a metal portion 21 and a resin 50. Because the bonding member 20 includes the resin 50, deterioration of the bonding member 20 allowed by a temperature change can be suppressed and reliability can be improved. In the case of silver (Ag) or copper (Cu) with a high thermal conductivity, stress-induced migration due to residual stress is likely to occur on the metal surface. On the other hand, by covering the metal surface with a resin, migration of the metal surface can be effectively prevented. The metal portion 21 is preferably formed of a material with a good thermal conductivity in order to efficiently transfer heat generated in the phosphor member 11 to the base 30. For example, the metal portion 21 preferably includes silver (Ag) or copper (Cu), and more preferably includes silver (Ag).

As a preferred aspect of the bonding member 20, the bonding member 20 may be disposed on a part of the lateral surface of the light-transmissive substrate 12. Preferably, the metal portion 21 included in the bonding member 20 is disposed on a part of the lateral surface of the light-transmissive substrate 12. Because the bonding member 20 or the metal portion 21 included in the bonding member 20 covers a part of the lateral surface of the light-transmissive substrate 12, a part of heat transferred to the light-transmissive substrate 12 can be released from the lateral surface of the light-transmissive substrate 12 to the base 30 via the bonding member 20. Although the bonding member 20 includes the metal portion 21 and the resin 50 as described above, a part of the lateral surface of the light-transmissive substrate 12 is preferably in contact with the metal portion 21 from the viewpoint of the heat dissipation property. According to such a configuration, heat transferred to the light-transmissive substrate 12 can be effectively dissipated by the metal portion 21 with a good thermal conductivity.

In FIGS. 2A and 2B, an aspect in which the bonding member 20 covers the lateral surface of the light-transmissive substrate 12 is illustrated as an example, but instead, the bonding member 20 may cover the lateral surface of the light-transmissive substrate 12 and a lateral surface of the antireflection film 14. A part of the bonding member 20 may creep up to the outer peripheral end of an upper surface of the antireflection film 14 to the extent that incident light and emitted light are not blocked.

—Metal Portion—

The metal portion 21 is preferably a metal sintered compact having a porous structure including voids. The metal sintered compact having the porous structure, as in the present disclosure, is obtained by heating and sintering a metal paste including a metal powder body, for example. The metal sintered compact having the porous structure includes a metal portion having a network structure in which a plurality of metal particles is continuously connected by fusing at least portions of the adjacent metal powders, and the voids are formed between the adjacent metal powders excluding the fused portions. Accordingly, the metal sintered compact having the porous structure as described in the present disclosure includes voids between the phosphor member 11 and the base (heat dissipation member), for example, in the wavelength conversion module.

Furthermore, the porous material generally refers to a material having a large number of pores, and is referred to as, for example, a microporous material, a mesoporous material, or a macroporous material, but the metal sintered compact in the present disclosure may contain voids having various sizes, for example, depending on the particle size distribution of the metal powder body before sintering. For example, when the metal sintered compact in the present disclosure is used as a bonding member that bonds two members, voids are also present in a portion sandwiched between the two members, thereby making it possible to ensure a strength high enough to withstand thermal stress while ensuring a heat transfer path more effectively.

The metal portion 21 may include a fillet spreading toward a bottom surface of the recessed portion 31*a* of the base 30, and the fillet may be disposed on at least a part of the lateral surface of the light-transmissive substrate 12.

Because the metal portion 21 covers the lateral surface of the light-transmissive substrate 12, a part of heat transferred to the light-transmissive substrate 12 can be released from the lateral surface of the light-transmissive substrate 12 to the base 30 via the metal portion 21. The "fillet" described in the present specification refers to a portion of the metal portion 21 protruding outward from the lateral surfaces of the phosphor member 11 and the light-transmissive substrate 12 and having a substantially triangular cross-sectional shape that increases the cross-sectional area downward from the phosphor member 11 side.

The metal portion 21 may cover the entire lateral surface of the phosphor member 11. The term "cover" described in the present specification means not only covering with the metal portion 21 and the phosphor member 11 in direct contact with each other, but also indirectly covering without direct contact between the metal portion 21 and the phosphor member 11. According to such a configuration, because the metal portion 21 covers the periphery of the phosphor member 11, a part of heat generated in the phosphor member 11 can be released from the lateral surface of the phosphor member 11 to the base 30 via the metal portion 21. The phosphor member 11 and the metal portion 21 may be in direct contact with each other.

In a preferred aspect, the light-transmissive substrate 12 may be in direct contact with the metal portion 21. According to such a configuration, a part of heat transferred to the light-transmissive substrate 12 can be released from the lateral surface of the light-transmissive substrate 12 to the base 30 via the metal portion 21. In a further preferred aspect, the metal portion 21 may cover 10% to 100% of the lateral surface of the light-transmissive substrate 12 from a lower surface of the light-transmissive substrate 12 in a thickness direction. In particular, the metal portion 21 may cover a lower portion of the light-transmissive substrate 12 from the center of the thickness of the light-transmissive substrate 12 in the thickness direction.

The metal portion 21 may contain spacer particles for making the bonding member 20 have a certain thickness or more. Thus, the thickness of the metal portion 21 between the base 30 and the phosphor member 11, that is, the thickness of the bonding member 20 can be made equal to or thicker than the particle size of the spacer particles. The spacer particles can be composed of zirconia particles, glass particles, silica particles, or alumina particles, and are preferably composed of zirconia particles. The particle size of the spacer particles is appropriately set in consideration of the spacing to be ensured between the base 30 and the phosphor member 11, but is set, for example, in a range from 20 μm to 500 μm, preferably in a range from 50 μm to 300 μm, more preferably in a range from 100 μm to 200 μm.

—Resin—

The bonding member 20 may include the resin 50 in addition to the metal portion 21 to achieve the suitable bonding member 2. The resin 50 increases a bonding area with the base 30 to enable strong bonding. The resin 50 preferably includes a first resin member 51 covering an outer surface of the metal portion 21, and second resin members 52 with which the voids of the metal sintered compact constituting the metal portion 21 are impregnated. By covering the metal portion 21 with the first resin member 51, sulfurization and oxidation of the metal portion 21 can be suppressed. The voids of the metal sintered compact constituting the metal portion 21 are impregnated with the second resin members 52, thereby increasing the resistivity against thermal stress. As can be appreciated from the fact that the voids of the metal sintered compact are impregnated with the second resin members 52, the bonding between the phosphor member 11 and the base 30 is mainly performed by the metal portion 21. In other words, the volume ratio of the second resin members 52 is preferably lower than the volume ratio of the metal portion 21.

The main component of the resin 50 (the first resin member 51 and the second resin members 52) is, for example, a thermosetting epoxy resin. A silicone resin or the like may also be used, but the epoxy resin is more preferable because the epoxy resin has a high gas barrier property and can shield the metal sintered compact from the outside air after the metal sintered compact is impregnated therewith. The thermosetting epoxy resin preferably does not contain halogen such as chlorine. The type of epoxy resin may be alicyclic, bisphenol A diglycidyl ether, bisphenol F diglycidyl ether, hydrogenated bisphenol A diglycidyl ether, hexahydrophthalate-diglycidyl ester, or the like, and various epoxy reactive diluents may be added as liquid products. Among these epoxy resins, the alicyclic epoxy resin is preferable. Because the alicyclic epoxy resin has a low viscosity and is good in filling property, the voids are less likely to occur. The glass transition temperature can be raised to 200° C. or more, and the glass transition temperature can be easily adjusted according to the needed heat resistant temperature.

—Particles Dispersed in Resin—

The resin 50 may contain dispersed particles 53. The particles 53 are preferably particles contained in an anti-foaming agent that effectively suppresses the generation of bubbles during resin filling. An anti-foaming agent may be obtained by, for example, blending and dispersing hydrophilic or hydrophobic particles (powder) in a medium such as silicone oil. Other than the silicone oil, a highly hydrophobic surfactant can be used as a medium. The former, silicone oil, is a foam suppressor anti-foaming agent suitable for non-aqueous materials, whereas the latter, the highly hydrophobic surfactant, is a foam suppressor anti-foaming agent suitable for aqueous materials. In the present embodiment, the silicone oil is preferably used because most of the resin materials correspond to non-aqueous materials. Also, hydrophilic silica, hydrophobic silica, or the like may be used as the hydrophilic or hydrophobic particles. As an anti-foaming agent, there are a foam suppressor anti-foaming agent that can effectively suppress the generation of foam and a foam-breaking anti-foaming agent that effectively breaks foam, but the foam suppressor anti-foaming agent is preferably used in consideration of scattering or the like of the resin material.

The average particle size of the hydrophilic or hydrophobic particles blended and dispersed in the medium is appropriately set in consideration of the size of the voids of an object to be impregnated and the particle settling during storage, but is, for example, in a range from 0.001 μm to 20 μm, preferably in a range from 0.01 μm to 10 μm, more preferably in a range from 0.05 μm to 5 μm. The content of the hydrophilic or hydrophobic particles is, for example, in a range from 0.001 parts by weight to 10 parts by weight, preferably in a range from 0.01 parts by weight to 5 parts by weight, more preferably in a range from 0.1 parts by weight to 3 parts by weight, with respect to 100 parts by weight of the medium.

The particles 53 may be included in any of the first resin member 51 and the second resin members 52; however, the second resin members 52 include almost no particles 53 inside the metal portion 21 and the particles 53 are disposed in the resin near the outer surface of the metal portion 21. That is, in the second resin member 52, the density of the particles 53 included in the second resin members 52 near the outer surface of the metal portion 21 is higher than the density of the particles 53 included in the second resin members 52 inside the metal portion 21. The density of the particles 53 dispersed in the first resin member 51 is higher than the density of the particles 53 dispersed in the second resin members 52 inside the metal portion 21.

The dispersed particles 53 have a function of acting on the surface of foam when the foam of the resin material for forming the resin 50 during the manufacturing of the wavelength conversion module reaches the liquid surface, thereby destabilizing the foam surface by disturbing the arrangement, and suppressing the growth of foam from the liquid surface. The foam suppression function of the resin member of the particles 53 is exhibited within the first resin member 51, and thus the second resin members 52 do not have to substantially include the particles 53.

—Reflective Film—

The reflective film 13*a* may be provided on the lower surface of the phosphor member 11. The lower surface of the phosphor member 11 refers to a surface opposite to the surface on which the light-transmissive substrate 12 is provided. The reflective film 13*a* can be composed of, for example, an $Al_2O_3$ film, an $SiO_2$ film, an $Nb_2O_5$ film, or a $TiO_2$ film, and is preferably composed of an $Al_2O_3$ film. The reflective film 13*a* is a transparent layer, and has a function of reflecting at least a part of light from the phosphor member 11 by an interface. Because the reflection of light by the reflective film 13*a* is reflection with less light absorption compared with the reflection of light by a metal, light can be efficiently reflected. The thickness of the reflective film 13*a* is preferably in a range from 0.1 μm to 5.0 μm.

—Bonding Metal—

The bonding metal 13*b* may be provided on a lower surface of the reflective film 13*a*. The lower surface of the reflective film 13*a* refers to a surface facing the base 30. The bonding metal 13*b* can be composed of, for example, an Ag film, a multilayer of an Ni film and an Ag film, a multilayer of an Ag film and an Au film, a multilayer of an Al film and an Ag film, an Au film, a multilayer of an Al film and an Au film, or a multilayer in which any metal layer is sandwiched between the multilayers, as a barrier layer for light reflection, adhesion, or heating, and is preferably composed of an Ag film. The thickness of the bonding metal 13*b* is preferably in a range from 0.1 μm to 100 μm.

—Antireflection Film—

In a preferred aspect, the antireflection film 14 may be provided on the upper surface of the light-transmissive substrate 12. The upper surface of the light-transmissive substrate 12 refers to an irradiation surface or an emission surface. For example, the antireflection film 14 can be composed of, for example, a metal oxide such as $SiO_2$, $Nb_2O_5$, or $TiO_2$, or a nitride such as SiN, GaN, or AlN, and is preferably composed of $SiO_2$. The antireflection film 14 may be composed of a single layer, but may be composed of a plurality of layers by layering a plurality of the above materials. The thickness of the antireflection film 14 is preferably a thickness for serving as an antireflection layer. For example, in the case of an $SiO_2$ single layer, the thickness of the antireflection film 14 is preferably in a range from 0.05 μm to 0.20 μm.

The outermost surface of the antireflection film 14 is preferably an oxide. Because the oxide generally has a large contact angle with respect to the resin, the oxide can reduce the wettability with respect to the resin. Accordingly, the resin adhesion to and contamination of the outermost surface of the antireflection film 14 at a light irradiation position and a light emission position can be reduced. The outermost surface of the antireflection film 14 is, for example, $SiO_2$.

The light-emitting device including the wavelength conversion module 100 of the present disclosure and the light source that irradiates the wavelength conversion module 100 with light is described below.

For example, a high output blue laser having an emission peak at a wavelength of 380 nm to 500 nm is preferably used as a light source LD. The light source LD is not limited to this wavelength, and a light source that outputs light with another wavelength may be used. The wavelength conversion module 100 of the present disclosure is irradiated with light emitted from the light source LD, for example, light with a specific wavelength via an optical system such as a dichroic mirror M and a lens L. That is, the light source LD is disposed so as to irradiate the wavelength conversion module 100 of the present disclosure with light.

In the wavelength conversion module 100, the light-transmissive substrate 12 is provided on a light-receiving surface side that receives light from the light source LD. Accordingly, even though heat is generated on the light-receiving surface (light irradiation surface) of the phosphor member 11 that receives light from the light source, the heat is easily transferred from the light-receiving surface (light irradiation surface) of the phosphor member 11 toward the light-transmissive substrate 12 with a high thermal conductivity, so that the heat can be effectively dissipated by the light-transmissive substrate 12.

The light emitted from the wavelength conversion module 100 is output via a predetermined optical system (for example, the dichroic mirror M, the lens L, and the like).

Figure 4:
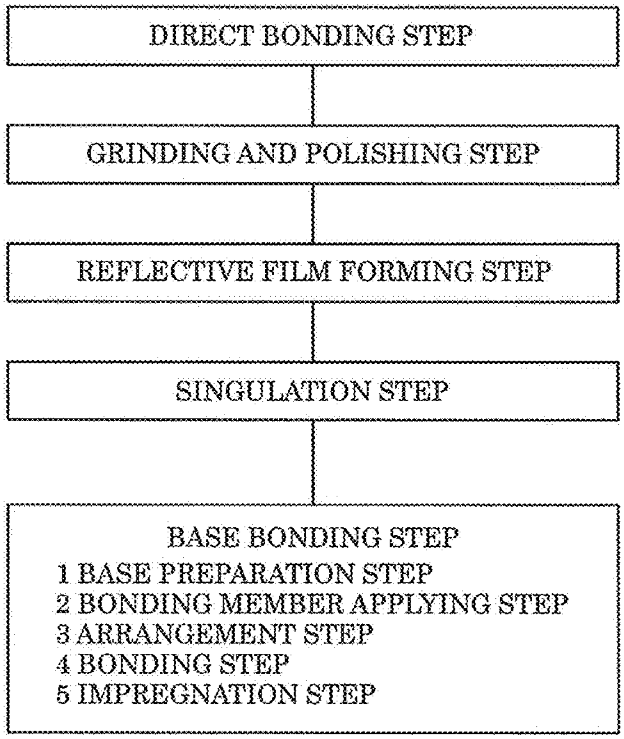
FIG. 4 is a flowchart of a method for manufacturing the wavelength conversion module according to the present disclosure.

A method for manufacturing the wavelength conversion module of the present disclosure is described below with reference to a manufacturing flow illustrated FIG. 4.

The method for manufacturing the wavelength conversion module of the present disclosure includes at least a step of directly bonding a light-transmissive plate and a phosphor plate to each other, and a step of singulating the directly bonded light-transmissive plate and phosphor plate. The planar shapes of the singulated light-transmissive substrate and phosphor member are substantially the same. At least one of a polishing step, a reflective film forming step, and a base bonding step may be provided as an additional step. The steps of the method for manufacturing the wavelength conversion module are sequentially described below.

—Direct Bonding Step—

A phosphor plate 11' and a light-transmissive plate 12' described above are prepared. As an example, a YAG plate formed of a sintered compact is prepared as the phosphor plate 11', and a sapphire substrate is prepared as the light-transmissive plate 12'. A sapphire substrate having a flat plate shape and a thickness in a range from 100 μm to 600 μm is prepared. The phosphor plate 11' and the light-transmissive plate may be ground and/or polished to a desired thickness.

Figure 5:
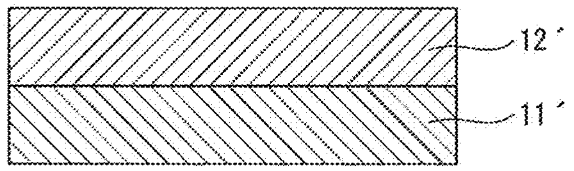
FIG. 5 is a process cross-sectional view of the method for manufacturing the wavelength conversion module according to the present disclosure, where FIG. 5(*a*) is a process cross-sectional view illustrating a direct bonding step and FIG. 5(*b*) is a process cross-sectional view illustrating a singulation step.
Figure 5:
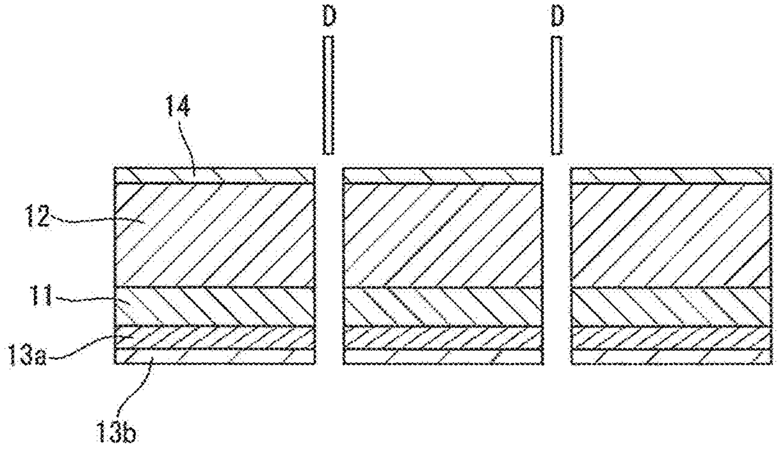

After the phosphor plate 11' and the light-transmissive plate 12' are prepared, a bonding surface of the phosphor plate 11' and a bonding surface of the light-transmissive plate 12' are irradiated with an ion beam or plasma to activate the bonding surfaces. Subsequently, the activated bonding surfaces are brought into contact with each other and directly bonded to each other (see FIG. 5(*a*)). The direct bonding method is not limited to the surface activated bonding, and for example, atomic diffusion bonding in which atoms at a bonding interface are diffused may be used.

—Polishing Step (Additional Step)—

After the direct bonding step, the phosphor plate 11' may be polished to a thickness in a range from 50 μm to 200 μm. The polishing step in the present specification may include both grinding and polishing. From the viewpoint of the heat dissipation property, the thickness of the phosphor plate 11' is preferably as thin as possible; however, because the wavelength conversion efficiency of the phosphor member 11 after singulation decreases when the thickness is less than 50 μm, the lower limit of the thickness is set to 50 μm. On the other hand, the thickness of the phosphor plate 11' is preferably 200 μm or less. Thus, heat generated in the vicinity of the irradiation surface of the phosphor member 11 after singulation is easily transferred to the base 30 side located below the phosphor member 11, and the heat dissipation property of the entire wavelength conversion module is improved. In the polishing step, the phosphor plate 11' is ground using a #1500 grindstone at a grindstone feed rate of 30 μm/min to 48 μm/min up to 10 μm before a target thickness. However, when the target thickness of the phosphor plate 11' is less than 100 μm, the grinding is stopped at 100 μm regardless of the target thickness in order to prevent cracking due to a grinding load. Subsequently, the phosphor plate 11' is preferably polished to the target thickness using a #22000 grindstone at a grindstone feed rate of 1 μm/min to 10 μm/min. Although the aspect in which the polishing step is performed after the direct bonding step has been described, the phosphor plate 11' having a thickness in a range from 50 μm to 200 μm may be prepared in advance before the direct bonding step.

—Reflective Film Forming Step (Additional Step)—

After the direct bonding step, the reflective film 13*a* is formed on the phosphor plate 11'. The reflective film 13*a* is formed to a thickness in a range from 0.1 μm to 5.0 μm by using a known film formation method (for example, a sputtering film formation method). The bonding metal 13*b* is formed after the reflective film 13*a* is formed. The bonding metal 13*b* is selected from, for example, an Ag film, a multilayer of a Ni film and an Ag film, a multilayer of an Ag film and an Au film, a multilayer of an Al film and an Ag film, an Au film, and a multilayer of an Al film and an Au film, and is formed to a thickness in a range from 0.1 μm to 100 μm by using a known film formation method (for example, sputtering film formation). An antireflection film may be further formed on the light-transmissive plate 12' by using a known film forming apparatus (for example, a sputtering apparatus). For example, in the case of an $SiO_2$ single layer, the antireflection film is formed in a range from 0.05 μm to 0.20 μm. The antireflection film 14 may be formed in a single layer or a plurality of layers, but as described above, an oxide is preferable for the outermost surface of the antireflection film in order to reduce contamination due to adhesion of a resin to be described below. More preferably, the outermost surface of the antireflection film 14 is preferably $SiO_2$.

—Singulation Step—

The directly bonded phosphor plate 11' and light-transmissive plate 12' are singulated using a dicing blade, a laser, or the like. In the method for manufacturing the wavelength conversion module of the present disclosure, because the directly bonded phosphor plate 11' and light-transmissive plate 12' are singulated with, for example, a dicing blade D (see FIG. 5(*b*)), the plane area of the phosphor member 11 and the plane area of the light-transmissive substrate 12 are substantially equal to each other after the singulation. The phosphor member 11 and the light-transmissive substrate 12 have a rectangular planar shape by the singulation, and have a size of, for example, 1 mm to 6 mm square.

—Base Bonding Step (Additional Step)—

The base bonding step includes a base preparation step, a bonding member applying step, an arrangement step, a bonding step, and an impregnation step.

1. Base Preparation Step

The base preparation step, as an example, is a step of preparing the base 30 including the base member 31 having the recessed portion 31*a*, the first metal layer 32, the second metal layer 33, and the third metal layer 34. A known processing technique may be used for forming the recessed portion, and a known film formation method (for example, sputtering film formation method) may be used for forming the first to third metal layers. The base 30 is not limited to the example described above, and a protruding portion may be provided instead of the recessed portion. Any one of the first metal layer 32 to the third metal layer 34 may be used, or the metal layer need not be provided.

2. Bonding Member Applying Step

First, a metal paste containing the metal powder body is prepared.

(1) Metal Paste Preparation

In the following description, a case in which silver particles are used as the metal powder is described, and the metal paste is referred to as a silver paste.

(1-1) Silver Particle Preparation

The shape of the silver particles to be prepared is not particularly limited, and may be, for example, substantially spherical or flake-shaped. In the present specification, the silver particle is "substantially spherical" implies that the aspect ratio (a/b) defined by the ratio of a major axis a to a minor axis b of the silver particle is 2 or less. When the silver particles are "flake-shaped", it implies that the aspect ratio is greater than 2. The major axis a and the minor axis b of the silver particles can be measured by image analysis using SEM.

The silver particles to be prepared have an average particle size of, for example, 0.3 μm or more, preferably 0.5 μm or more, more preferably 1 μm or more, even more preferably 2 μm or more. The silver particles have an average particle size of preferably 10 μm or less, more preferably 5 μm or less. When the average particle size is 0.5 μm or more, more preferably 1 μm or more, the silver particles do not aggregate even without forming the protective film such as a capping agent on the surface of the silver particles, so the protective film does not need to be thermally decomposed and sintering can be performed at a low temperature. The large particle size of the silver particles improves the fluidity of the silver paste. Therefore, when the silver paste has the same fluidity (workability), the silver paste can contain more silver particles. When the average particle size is 10 μm or less, more preferably 5 μm or less, a melting point depression phenomenon occurs due to an Increase in the specific surface area of the silver particles, and as a result, the sintering temperature can be lowered. The particle size of the silver particles can be measured by a laser diffraction method. In the present specification, the "average particle size" implies a volume-based median diameter measured by the laser diffraction method (a value in which the integrated volume frequency calculated from the particle size distribution is 50%).

The content of the silver particles to be prepared preferably is 5 mass % or less of silver particles having a particle size of less than 0.3 μm, and more preferably 15 mass % or less of silver particles having a particle size of 0.5 μm or less. The silver particles tend to be sintered at low temperatures as the particle size decreases. In particular, nano-sized silver particles are sintered at a lower temperature than a sintering temperature of micro-sized silver particles. Therefore, a large content of the nano-sized silver particles in the silver paste will cause sintering to start at a low temperature, and the fusion may occur in a state where the silver particles are not sufficiently in contact with each other.

The silver particles to be prepared may have a trace amount of silver oxide film, sulfur film, etc. on the surface thereof. Because silver is a precious metal, the silver particles themselves are not easily oxidized and are very stable. However, when viewed in the nano region, silver easily adsorbs sulfur, oxygen, etc. in the air, for example, and tends to form a thin film on the surface of the silver particles. The thickness of the oxide film, the sulfide film, etc. on the silver particles is preferably 50 nm or less, more preferably 10 nm or less.

(1-2) Mixing of Silver Particles and Organic Solvent

Here, the prepared silver particles and an organic solvent as a dispersion medium are mixed. Furthermore, the silver paste may include a resin, etc. The content of the silver particles at the time of mixing is preferably 70 mass % or more, more preferably 85 mass % or more. The mixable resin is decomposed by heating during sintering to be described below, and does not remain in the bonded body to be formed. The resin may be, for example, polystyrene (PS) or polymethyl methacrylate (PMMA). Mixing the silver particles with an organic solvent that is a dispersion medium facilitates applying the silver paste to the surface of the base at a desired thickness. The organic solvent used here may be, for example, one organic solvent, or a mixture of two or more types of organic solvents, such as a mixture of diol and ether. The boiling point of the organic solvent is preferably in a range from 150° C. to 250° C. When the boiling point is 150° C. or more, the contamination of silver particles by the atmosphere and the dropping of chips due to drying before the heating step can be prevented. When the boiling point is 250° C. or less, the volatilization rate in the heating step is increased, and sintering can be promoted.

In addition to the silver particles and the dispersion medium, additives such as a dispersant, a surfactant, a viscosity modifier, and a diluting solvent, and spacer particles, etc. may be mixed. The content of the additive in the silver paste may be such that the total amount of the additive is 5 mass % or less, for example, in a range from 0.5 mass % to 3 mass %, with respect to the amount of the silver paste. In particular, by adding spacer particles, the thickness of the metal paste can be controlled with sufficient reproducibility. This allows stable impregnation with the resin, which is preferable. In the above description, the silver paste formed using the silver particles has been described as an example, but the present embodiment is not limited to use of the silver paste, and may use a metal paste composed of metal particles other than the silver particles, for example, copper particles.

(2) Application of Prepared Metal Paste on Base

Here, the metal paste is applied on the base 30. Specifically, the prepared metal paste is applied on the bottom surface of the recessed portion 31*a*. As a method for applying the metal paste, a known method, such as a screen printing method, an offset printing method, an ink jet printing method, a flexographic printing method, a dispenser printing method, a gravure printing method, stamping, dispense, squeegee printing, silk screen printing, spraying, brush painting, and a coating method, can be appropriately employed. The application thickness of the metal paste can be appropriately set according to the application, etc., and can be, for example, in a range from 1 μm to 1000 μm, preferably in a range from 5 μm to 800 μm, more preferably in a range from 10 μm to 500 μm.

3. Arrangement Step

On the metal paste applied on the bottom surface of the recessed portion 31*a*, the singulated light-transmissive substrate 12 and phosphor member 11 are placed in a direction in which the phosphor member 11 and the metal paste face each other. For example, the singulated light-transmissive substrate 12 and phosphor member 11 are placed from above the metal paste, and are pressed such that the metal paste between the phosphor member 11 and the bottom surface of the recessed portion 31*a* has a predetermined thickness and the metal paste preferably creeps up on a part of the lateral surface of the light-transmissive substrate 12.

4. Bonding Step

In the bonding step, the metal paste is heated to remove the organic solvent and the metal powder is fused. Thus, the metal powder body is sintered, and the base 30 and the phosphor member 11 are bonded by a metal sintered compact having a porous structure including voids. The heating and sintering here may be performed in a reducing atmosphere and then in an oxidizing atmosphere, if necessary.

(1) Heating Temperature (1-1) Heating in Reducing Atmosphere

Heating in a reducing atmosphere is carried out as needed as described above, and is optional. The heating in the reducing atmosphere removes a trace amount of oxide film, etc. present on the surface of the metal powder by reduction, thereby exposing the metal atom on the surface of the metal powder to promote surface diffusion of the metal atom on the metal powder surface. Therefore, the sintering of the metal particles at a low temperature can be promoted in heating in a subsequent oxidizing atmosphere.

The heating in the reducing atmosphere and the heating in the oxidizing atmosphere to be described below may be performed in separate apparatuses, but it is preferable to perform the heating in the reducing atmosphere and the heating in the oxidizing atmosphere in the same apparatus, whereby the heating in the reducing atmosphere and the heating in the oxidizing atmosphere can be successively carried out in the same apparatus. The reducing atmosphere is preferably an atmosphere containing a formic acid or a hydrogen-containing atmosphere, and is preferably a mixture of a formic acid or hydrogen in an inert gas such as nitrogen, for example. The reducing atmosphere more preferably contains a formic acid, and is preferably a mixture of a formic acid with an inert gas such as nitrogen.

The heating in the reducing atmosphere is performed, for example, at lower than 300° C., preferably 280° C. or less, more preferably 260° C. or less, even more preferably 200° C. or less. The heating temperature in the reducing atmosphere is preferably 150° C. or more, more preferably 160° C. or more, even more preferably 180° C. or more. When the heating temperature is 150° C. or more, more preferably 160° C. or more, even more preferably 180° C. or more, the reaction rate of the reduction reaction of the oxide film present on the surface of the silver particles can be increased. The pressure when heating in the reducing atmosphere is not particularly limited, and may be, for example, atmospheric pressure.

(1-2) Sintering in Oxidizing Atmosphere

Here, by heating and sintering the metal particles in an oxidizing atmosphere, the metal particles are fused to each other to form a metal sintered compact. The oxidizing atmosphere is preferably an oxygen-containing atmosphere, more preferably an atmospheric atmosphere. When the oxidizing atmosphere is the oxygen-containing atmosphere, the oxygen concentration in the atmosphere is preferably in a range from 2 volume % to 21 volume %. The higher the oxygen concentration in the atmosphere is, the more the surface diffusion of metal atoms is promoted on the surface of the metal particles, and the easier it is to fuse the metal particles to each other. When the oxygen concentration is 2 volume % or more, fusion can be performed at a low heating temperature, and when the oxygen concentration is 21 volume % or less, the heating apparatus does not need a pressurizing mechanism, and the process cost can be reduced.

(2) Sintering Temperature

The sintering temperature in the oxidizing atmosphere is, for example, 300° C. or less, preferably 280° C. or less, more preferably 260° C. or less, even more preferably 200° C. or less. When the heating in the reducing atmosphere is performed before the sintering in the oxidizing atmosphere, sintering at a lower temperature becomes possible. The sintering in the oxidizing atmosphere is performed at preferably 150° C. or more, more preferably 160° C. or more. By setting the sintering temperature to 150° C. or more, more preferably 160° C. or more, a metal sintered compact with a low electrical resistivity and good thermal conductivity properties can be formed. The sintering in the oxidizing atmosphere may be performed by pressurization or, for example, atmospheric pressure.

5. Impregnation Step

In the impregnation step, first, a resin material including an anti-foaming agent including hydrophilic or hydrophobic particles is prepared. The prepared resin material is then defoamed by depressurization before application of the resin material. For example, the resin material is supplied to a syringe, and the syringe is placed in a vacuum defoamer to defoam the resin material before application. The depressurizing and defoaming in this manner can efficiently allow defoaming of the bubbles that are not able to be floated up due to their extremely small size and low buoyancy, which are contained during the preparation of the resin material and the supply thereof into the syringe. For example, the vacuum level during the defoaming is set, for example, in a range from $10^3$ Pa to $10^{-3}$ Pa, preferably in a range from $10^2$ Pa to $10^{-2}$ Pa, more preferably in a range from 10 Pa to $10^{-1}$ Pa. Further, because the resin material used in this manufacturing method contains an anti-foaming agent, large bubbles are suppressed from being formed and defoamed even when the pressure is reduced in the defoaming step, and for example, spillage from a syringe can be prevented.

Subsequently, the defoamed resin material is applied to the surface of the metal sintered compact. The amount of resin to be applied is set to be greater than or equal to the amount of the resin when being supplied into the entire voids of the metal sintered compact. Specifically, for example, the amount of resin to be applied is set to be greater than or equal to the volume of the voids of the metal sintered compact obtained based on the sintering density of the metal sintered compact and the entire volume of the metal sintered compact. Here, in consideration of being supplied in the voids of the metal sintered compact, the resin material to be applied preferably has a low viscosity, but reducing of viscosity allows the following issues. For example, when a metal sintered compact is used as the bonding member, the surface of the metal sintered compact to be applied is typically inclined rather than horizontal. In such a case, the applied resin material may spread horizontally and reach a region where the resin material such as a wire pad is not to be applied. A measure for suppressing the spread of the applied resin material in the horizontal direction is preferably devised. For example, the resin material after defoaming is applied by a syringe into the recessed portion on the outer side of the phosphor member 11, that is, in a region between the lateral surface of the recessed portion and the surface of the fillet.

Subsequently, the resin material applied to the surface of the metal sintered compact (the surface of the fillet) is depressurized to discharge the gas in the voids, and then the voids are impregnated with the resin material. The vacuum level at the time of impregnation is appropriately adjusted such that the entire voids are impregnated with the resin material while suppressing excessive foaming, according to the volume fraction of the voids and the size of the voids in the metal sintered compact, and the vacuum level at the time of impregnation is set, for example, in a range from $10^3$ Pa to $10^{-3}$ Pa, preferably in a range from $10^2$ Pa to $10^{-2}$ Pa, more preferably in a range from 10 Pa to $10^{-1}$ Pa. Because the air remaining between the phosphor member 11 and the bottom surface of the recessed portion 31*a* is large to some extent in the resin applying step, the air floats by its own buoyancy. Therefore, unlike in the defoaming step, the air is removed to some extent even at normal pressure, but is not completely removed, and thus the pressure is preferably reduced. In this manufacturing method, because the resin material contains an anti-foaming agent including hydrophilic or hydrophobic particles, even when the resin material is applied and then depressurization is performed, the gas in the voids is defoamed as small bubbles without growing into large bubbles on the surface of the resin material. In this manner, excessive foaming can be suppressed, the gas in the voids can be removed, and the scattering of the resin material or the unnecessary spread of the resin material can be suppressed. Furthermore, because the foam contained in the resin material itself is removed by depressurization before application, foaming of the resin material due to the foam contained in the resin material itself can be suppressed. Because the hydrophilic or hydrophobic particles (powder) contained in the anti-foaming agent are particles, such particles do not easily enter into the central portion of the voids of the metal sintered compact, and do not need to enter into the central portion. That is, even when the resin material remains near the surface of the metal sintered compact to which the resin material is applied, the foam suppressor function or the foam-breaking function by the particles is exhibited in the vicinity of the surface of the metal sintered compact, and excessive foaming of the resin material is suppressed.

Finally, the resin material with which the voids are impregnated is cured by heating. In this manner, the wavelength conversion module of the present embodiment is fabricated.

EXAMPLES

In order to evaluate the effect of the heat dissipation property with respect to the wavelength conversion module including the light-transmissive substrate, wavelength conversion modules of a first example and a comparative example described below were produced.

First Example

The wavelength conversion module illustrated in FIG. 2 includes:

Antireflection film: $SiO_2$ (110 nm in thickness);

Light-transmissive substrate: sapphire substrate (1.0×1.0×0.55 mm, thermal conductivity: 42 W/m·K);

Phosphor member: YAG sintered compact (1.0×1.0×0.15 mm, thermal conductivity: 11.7 W/m·K);
Reflective film: $Al_2O_3$ (700 nm in thickness);
Bonding metal: Ag (500 nm in thickness);
Bonding member: Ag sintered material (impregnated with epoxy); and
Base: Ni/Au metal layer (partially containing Ag) on Cu base member.

Comparative Example

A wavelength conversion module is the same as the wavelength conversion module of the first example except that the light-transmissive substrate is not provided.

Figure 6:
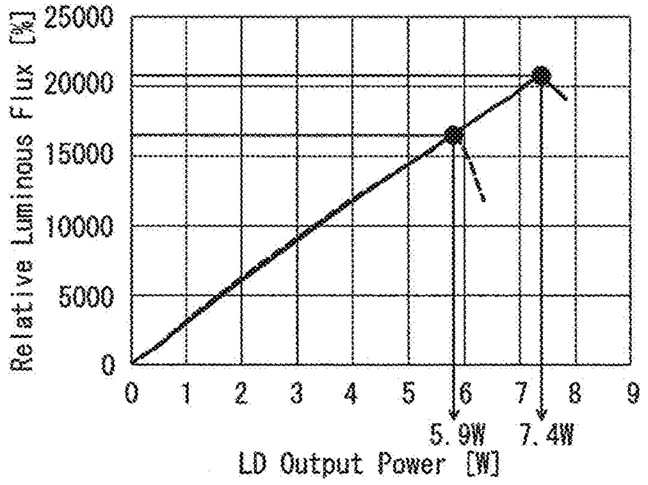
FIG. 6 is a graph showing the relationship between the irradiation power of a blue laser and the output of light emitted from a phosphor member with respect to wavelength conversion modules of a first example and a comparative example.

With respect to the wavelength conversion modules of the first example and the comparative example, the relationship between the irradiation power of a blue laser and the output of light emitted from the phosphor member was evaluated (FIG. 6). In FIG. 6, a horizontal axis corresponds to the irradiation power of the blue laser, and a vertical axis corresponds to the output of fluorescent light emitted from the phosphor member. The output emitted from the phosphor member includes two kinds of light: blue light and fluorescent light, and the blue light is separated by the dichroic mirror. Therefore, the blue light was not included in the above evaluation, and only the fluorescent light was evaluated.

According to FIG. 6, the wavelength conversion module of the first example was able to appropriately output light from the phosphor member even though the phosphor member is irradiated with a blue laser having an irradiation power of 7.4 W. On the other hand, in the wavelength conversion module of the comparative example, when the phosphor member is irradiated with a blue laser having an irradiation power of 5.9 W or more, the phosphor member deteriorates due to heat, resulting in decrease of light output from the phosphor member. According to the evaluation results, it was found that, in the wavelength conversion module of the first example, heat generated in the phosphor member is appropriately dissipated by the light-transmissive substrate, and the output of the blue laser that can be emitted to the phosphor member can be improved from 5.9 W to 7.4 W. The output light from the phosphor member can also be improved.

Subsequently, as a wavelength conversion module that can further improve the heat dissipation property, a wavelength conversion module of a second example was produced.

Second Example

The wavelength conversion module is the same as the wavelength conversion module of the first example except that the phosphor member (YAG sintered compact) is 1.0×1.0×0.075 mm (that is, the phosphor member is half as thick as the phosphor member of the first example).

Figure 7:
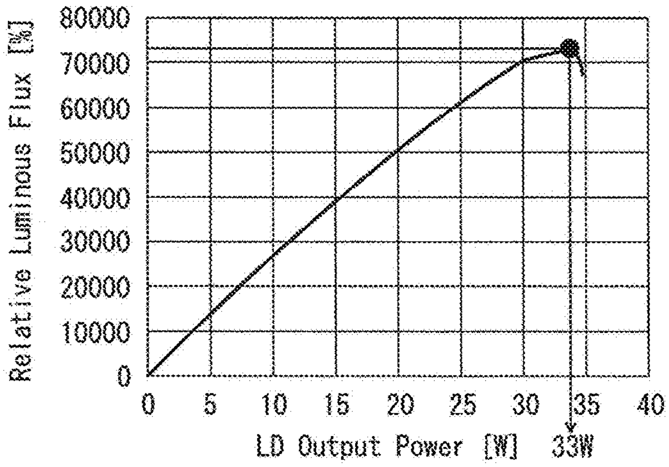
FIG. 7 is a graph showing the relationship between the irradiation power of a blue laser and the output of light emitted from a phosphor member with respect to a wavelength conversion module of a second example.

With respect to the wavelength conversion module of the second example, the relationship between the irradiation power of a blue laser and the output of light emitted from the phosphor member was evaluated (FIG. 7). According to FIG. 7, the wavelength conversion module of the second example was able to appropriately output light from the phosphor member even though the phosphor member is irradiated with a blue laser having an irradiation power of 33 W. That is, the thinner the thickness of the phosphor member is, the more easily heat is dissipated to the light-transmissive substrate.

The embodiments disclosed this time are illustrative in all respects and are not intended to be the basis of limiting interpretation. Accordingly, the technical scope of the present disclosure is not construed solely by the embodiment described above but is defined based on the description of the scope of claims. In addition, the technical scope of the present disclosure includes all variations within the meaning and scope equivalent to the scope of claims.

The resin impregnation method according to the described embodiments can be used for fixing a semiconductor element, a submount substrate, or the like. Further, the wavelength conversion module and the manufacturing method thereof can be used for headlights of automobiles, illumination fixtures, projectors, and the like.

REFERENCE CHARACTER LIST

1 Light-emitting device
11 Phosphor member
11' Phosphor plate
12 Light-transmissive substrate
12' Light-transmissive plate
13*a* Reflective film
13*b* Bonding Metal
14 Antireflection film
20 Bonding member
21 Metal portion
30 Base
31 Base member
31*a* Recessed portion
32 First metal layer
33 Second metal layer
34 Third metal layer
50 Resin
51 First resin member
52 Second resin member
53 Particle
100 Wavelength conversion module
D Dicing blade
L Lens
LD Light source
M Dichroic mirror

The invention claimed is:

1. A wavelength conversion module comprising:
a phosphor member that is a rare earth aluminate sintered compact having a composition represented by Formula (I) below:

$$(Ln_{1-n}Ce_n)_3(Al_{1-m}M^1_m)_5O_{12} \quad (I)$$

where Ln is at least one rare earth element selected from the group consisting of Y, La, Lu, Gd, and Tb, $M^1$ is at least one element selected from Ga and Sc, and m and n are numbers satisfying $0 \leq m \leq 0.02$ and $0.0017 \leq n \leq 0.0170$; and
a light-transmissive substrate that is directly bonded to the phosphor member, wherein a higher thermal conductivity of the light-transmissive substrate is higher than a thermal conductivity of the phosphor member, and the light-transmissive substrate has a thickness in a range from 100 μm to 600 μm.

2. The wavelength conversion module according to claim 1, further comprising:
a reflective film on a surface opposite to a surface on which the light-transmissive substrate is bonded.

3. The wavelength conversion module according to claim 1, wherein:

in a plan view, a plane area of the phosphor member and a plane area of the light-transmissive substrate are substantially equal to each other.

4. The wavelength conversion module according to claim 1, wherein:

in a plan view, the phosphor member and the light-transmissive substrate have a rectangular shape.

5. The wavelength conversion module according to claim 1, wherein: a thickness of the phosphor member is in a range from 50 μm to 200 μm.

6. The wavelength conversion module according to claim 1, further comprising:

a base; and a bonding member that bonds the base and the phosphor member to each other, wherein:

the bonding member is disposed on a part of a lateral surface of the light-transmissive substrate.

7. The wavelength conversion module according to claim 6, wherein: the bonding member comprises a metal portion.

8. The wavelength conversion module according to claim 6, wherein:

the bonding member comprises:

a metal portion having a porous structure, and a resin partially disposed in the metal portion having the porous structure.

9. The wavelength conversion module according to claim 1, wherein:

a Ce content (mol %) of the phosphor member is in a range from 0.025 mol % to 0.255 mol %.

10. The wavelength conversion module according to claim 1, wherein:

the thermal conductivity of the light-transmissive substrate is 15 W/m K or more.

11. The wavelength conversion module according to claim 1, wherein:

the wavelength conversion module is a reflective-type wavelength conversion module.

12. The wavelength conversion module according to claim 1, wherein:

the phosphor member consists of the rare earth aluminate sintered compact.

13. A light-emitting device comprising:

the wavelength conversion module according to any claim 1; and a light source configured to irradiate the wavelength conversion module with light.

14. The light-emitting device according to claim 13, wherein:

the light-transmissive substrate is provided on a light-receiving surface side of the phosphor member that receives the light from the light source.

15. A method for manufacturing a wavelength conversion module, the method comprising:

directly bonding a light-transmissive plate and a phosphor plate to each other, wherein the phosphor plate is a rare earth aluminate sintered compact having a composition represented by Formula (I) below:

$$(Ln_{1-n}Ce_n)_3(Al_{1-m}M^1_m)_5O_{12} \quad (I)$$

where Ln is at least one rare earth element selected from the group consisting of Y, La, Lu, Gd, and Tb, $M^1$ is at least one element selected from Ga and Sc, and m and n are numbers satisfying $0 \le m \le 0.02$ and $0.0017 \le n \le 0.0170$; and singulating the light-transmissive plate and the phosphor plate that are directly bonded to each other, to obtain a plurality of singulated bodies in each of which a singulated light-transmissive substrate and a singulated phosphor member are directly bonded, wherein:

planar shapes of each of the light-transmissive substrates and each of the phosphor members are substantially the same as each other.

16. The method for manufacturing a wavelength conversion module according to claim 15, wherein:

in the direct bonding of the light-transmissive plate and the phosphor plate to each other, a thickness of the light-transmissive plate is in a range from 100 μm to 600 ||m.

17. The method for manufacturing a wavelength conversion module according to claim 15, wherein:

in the direct bonding of the light-transmissive plate and the phosphor plate to each other, the direct bonding is performed by surface activated bonding or atomic diffusion bonding.

18. The method for manufacturing a wavelength conversion module according to claim 15, further comprising:

before the singulating, polishing the phosphor plate.

19. The method for manufacturing a wavelength conversion module according to claim 18, wherein:

in the polishing, the phosphor plate is polished to a thickness in a range from 50 μm to 200 μm.

20. The method for manufacturing a wavelength conversion module according to claim 15, further comprising:

before the singulating, forming a reflective film on a surface of the phosphor plate opposite to a surface on which the light-transmissive plate is provided.

21. The method for manufacturing a wavelength conversion module according to claim 15, further comprising:

after the singulating, bonding each singulated body to a respective base.

22. The method for manufacturing a wavelength conversion module according to claim 21, wherein:

in the bonding of each singulated body to the respective base, a part of a lateral surface of each light-transmissive substrate is covered with a bonding member.

* * * * *